May 7, 1957 F. W. RIEHL 2,791,400
SURFACE CONDENSER
Filed Oct. 30, 1953 8 Sheets-Sheet 1

INVENTOR.
FREDERICK W. RIEHL
BY
ATTORNEY

May 7, 1957

F. W. RIEHL 2,791,400

SURFACE CONDENSER

Filed Oct. 30, 1953

INVENTOR.
Frederick W. Riehl
BY
ATTORNEY

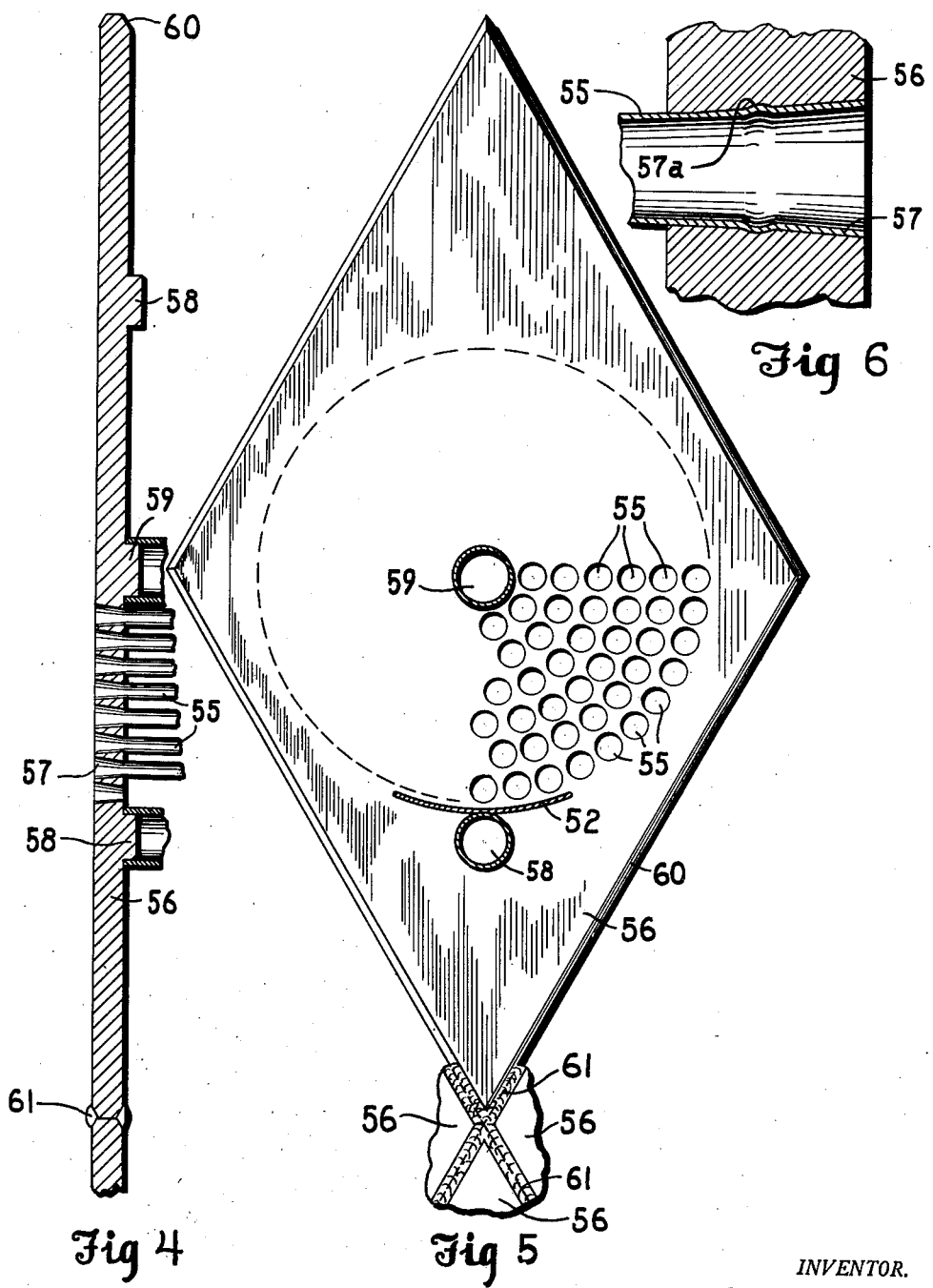

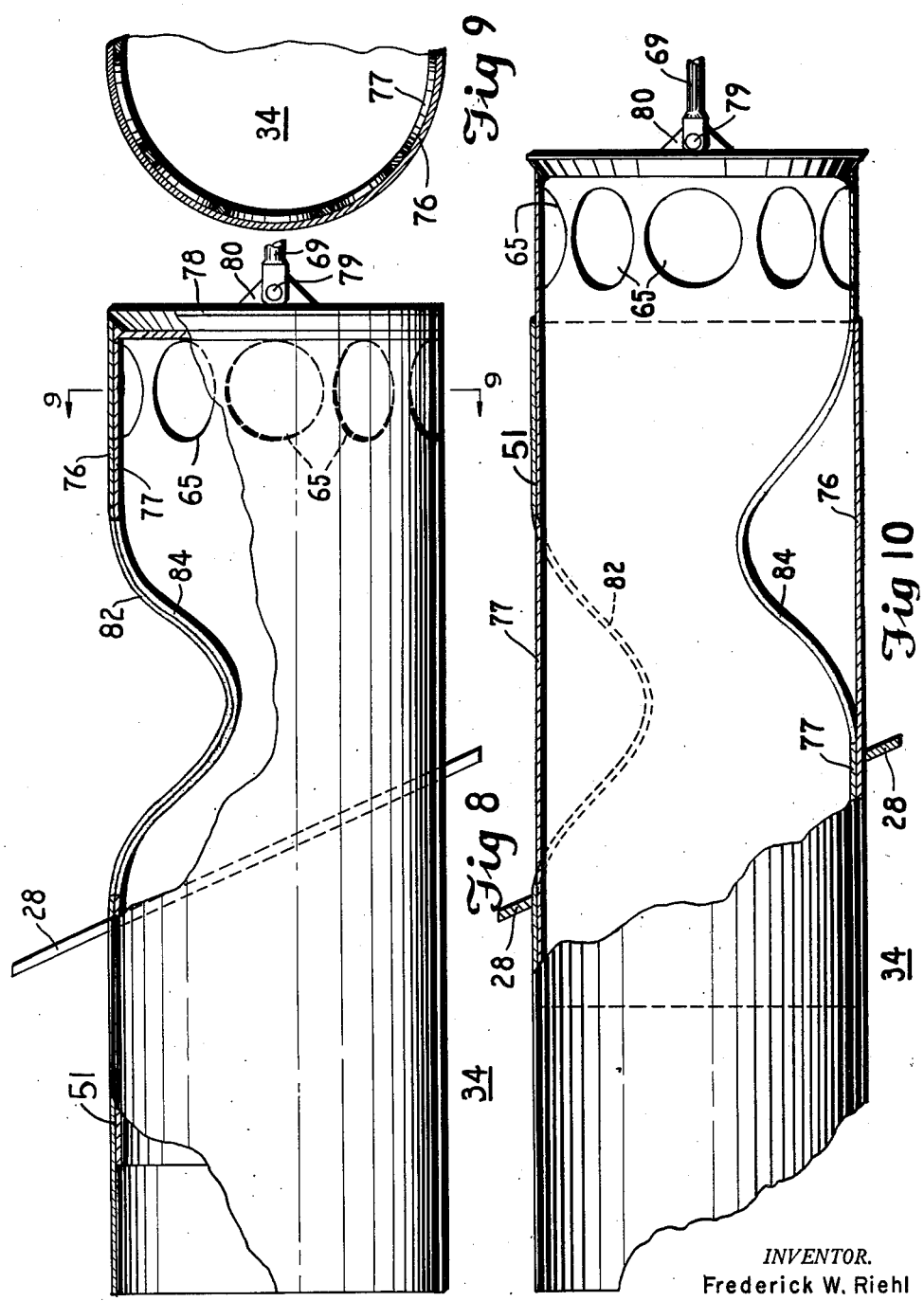

May 7, 1957 F. W. RIEHL 2,791,400
SURFACE CONDENSER
Filed Oct. 30, 1953 8 Sheets-Sheet 6

INVENTOR.
FREDERICK W. RIEHL
BY
ATTORNEY

May 7, 1957 F. W. RIEHL 2,791,400
SURFACE CONDENSER
Filed Oct. 30, 1953 8 Sheets-Sheet 7

INVENTOR.
FREDERICK W. RIEHL
BY
ATTORNEY

May 7, 1957  F. W. RIEHL  2,791,400
SURFACE CONDENSER
Filed Oct. 30, 1953  8 Sheets-Sheet 8

INVENTOR.
FREDERICK W. RIEHL
BY
ATTORNEY

United States Patent Office 2,791,400
Patented May 7, 1957

2,791,400

SURFACE CONDENSER

Frederick W. Riehl, Denver, Colo.

Application October 30, 1953, Serial No. 389,423

23 Claims. (Cl. 257—2)

This invention relates to vapor condensing apparatus and particularly to surface condensers for use in steam power plants to condense the exhaust steam from steam turbines.

The steam condenser conventionally employed in steam turbine generating plants today is a very heavy piece of equipment requiring a large volume of space and also a heavy supporting structure. Furthermore, these equipments are costly to manufacture and to install in the field, and the time required for field erection is great. The conventional condenser includes a great multitude of special alloy cooling water tubes of great length and which are very costly to repair and replace after installation. In addition, it has been observed that these conventional condensers do not operate in a manner to secure the most effective use of the available surface of the cooling tubes. Furthermore, the construction of these condensers is such that a relatively small proportion of the total cooling area is reached by the steam as it initially proceeds from the exhaust of the turbine, and for this reason the conventional condenser has a relatively small area which constitutes the primary condensing surface. Other difficulties have been encountered in the operation of conventional condensers in the arrangements employed for removing noncondensible gases and in securing effective distribution of the cooling water. A further difficulty sometimes encountered occurs because of strains on the turbine exhaust hood brought about by external unbalanced forces acting on the condenser shell and by inherent unbalanced conditions within the condenser. Accordingly, it is an object of this invention to provide a vapor condenser of the surface type including improved structural features for securing more effective and more economical operation.

It is another object of this invention to provide a surface condenser including structural features which make it possible to reduce both the total weight and physical size of a condenser required for operation at a given capacity.

It is another object of this invention to provide a condenser of the surface type having an improved arrangement for cleaning the cooling tubes while the condenser is in service.

It is a further object of this invention to provide a vapor condenser of the surface type having an improved arrangement for distributing the steam or vapor supplied to the condenser and for increasing the effectiveness of the full surface area of the cooling tubes.

It is a still further object of this invention to provide a vapor condenser of the surface type including improved features of construction whereby more economic use may be made of the cooling tubes.

It is another object of this invention to provide an improved surface condenser having a greater primary cooling surface area.

A further object of this invention is to provide a surface condenser for operation in connection with steam turbine generating plants and the like and wherein there is minimum likelihood of water logging of the cooling tubes.

It is a still further object of this invention to provide a surface condenser having an improved water circuit and one wherein the aeration or the removal of noncondensible gas can be accomplished with increased effectiveness.

It is a still further object of this invention to provide an improved surface condenser construction for attachment to the exhaust hood of a steam turbine and including arrangements for effecting balanced operating conditions whereby external forces acting on the shell of the condenser and on the exhaust hood are minimized.

It is a still further object of this invention to provide a surface condenser of improved construction for facilitating the erection of the condenser shell in the field at the power plant and for affording factory assembly of critical or complex components of the structure.

Another object of this invention is to provide an improved method for minimizing the strains produced in the exhaust hood of a turbine by a condenser secured thereto.

Further objects and advantages of this invention will become apparent as the following description proceeds and the features of novelty which characterize the invention will be pointed out with particularity in the claims annexed to and forming a part of this specification.

In carrying out the objects of this invention in one embodiment, a surface condenser is constructed to have two symmetrically arranged half sections, these sections or condenser chambers being arranged on either side of a central vertical plane passing through the axis of a steam turbine of the power plant. A central partition structure is provided dividing the condenser into its two chambers and an automatic steam distributing valve or vane is mounted above the partition structure directly below the outlet from the steam turbine. This vane is actuated automatically to distribute the steam flowing from the turbine in equal quantities to the two halves of the condenser. Cooling water is distributed symmetrically to the cooling tubes in the two halves of the condenser, the water preferably flowing from a central inlet connection in the partition structure through the tubes and thence back through the return tubes to an outlet connection in the partition structure. The cooling water inlet and outlet connections are made along the axis of the condenser and unbalanced external forces which might otherwise result from the placing of the cooling water connections are thereby eliminated. The cooling water tubes are assembled in clusters or bundles between individual sectional portions of the head plates of the condensers. These clusters of cooling tubes may be manufactured at the factory and shipped to the site of the power plant and there assembled by welding the end plates of the sections together to form the complete end plate of the condenser in a relatively short field erection time. The clusters are arranged and spaced so that a large number of them are in direct line to receive the steam from the exhaust hood of the turbine and thus a large primary cooling surface is provided. Certain of the clusters of tubes are provided with central gas removing tubes having orifices therein extending along the axis of the cluster and noncondensible gases may thus be removed at an effective portion of the condenser remote from the inlet; this also provides positive gas circulation paths. By providing longitudinal baffles between certain of the tube clusters in each half of the condenser the steam may be directed so that it flows along the tubes farthest from the inlet in a direction which is in counterflow with the cooling water flowing through the tube. This makes it possible to obtain the advantage of counterflow in the transfer of heat between the condensing steam and the cooling water.

In a second embodiment of the invention the condenser sections are arranged so that the tubes slope from the outer ends downwardly toward the central axis of the condenser. This sloping arrangement causes the water which condenses on the tubes to flow downwardly along the lower sides of the tube surfaces toward the central axis and thereby minimizes the amount of water distributed on other portions of the tube surfaces and results in a great reduction of the water logging or shielding of the active surfaces of the tubes by the collection of condensate. The condensed steam is collected in a well below the condenser along the central axis and this well is constructed to provide a vapor barrier between the condensing area and the well; an arrangement is then provided to remove noncondensible gases from the well and thereby minimizes the blanketing of condenser tubes with noncondensibles and the consequent reduction in the effectiveness of the cooling surface.

These arrangements provide balanced constructions which make it possible to construct a condenser so that its total weight is less than that of conventional condensers; as a result, the entire condenser may be suspended from the turbine hood and does not require additional external supports. Furthermore, the total amount of cooling water required to be in the condenser is reduced with consequent reduction of the total weight suspended from the turbine.

For a better understanding of the invention, reference may be had to the accompanying drawings in which:

Fig. 4 is an enlarged sectional view of the end plate of one of the tube clusters;

Fig. 5 is a plan view of the plate shown in Fig. 4;

Fig. 6 is a greatly enlarged sectional view of the end of one of the cooling water tubes mounted in the end plate of Fig. 4;

Fig. 8 is an enlarged view of one of the water regulating valves of the condenser;

Fig. 9 is a partial sectional view of the valve along the line 9—9 of Fig. 8;

Fig. 10 is a view similar to that of Fig. 8 showing the valve in its opposite position;

Figure 1:
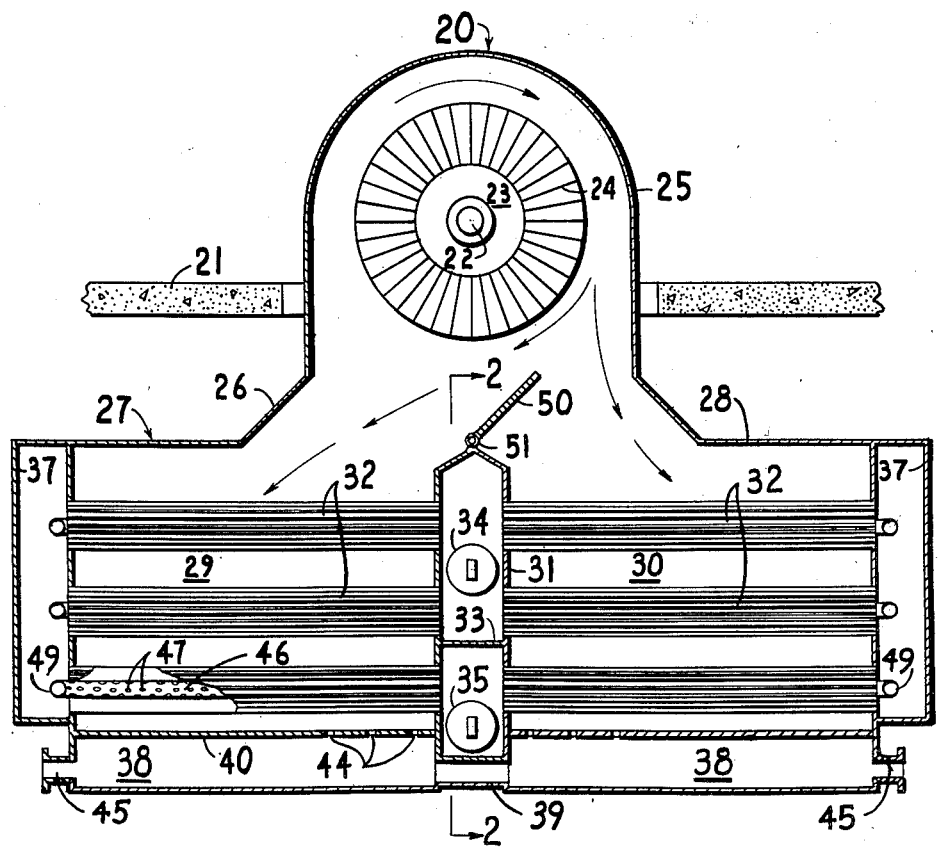
Fig. 1 is a longitudinal elevation view in section of a surface condenser embodying the invention mounted on a steam turbine.

Referring now to the drawings the steam turbine generating apparatus illustrated in Fig. 1 comprises a steam turbine 20 which is supported in a manner well known in the art on a floor structure 21 of the plant building. The steam turbine comprises a shaft 22 on which is mounted the usual rotor 23, the last set of blades operating at the lowest steam pressure being illustrated at 24, and the exhaust steam from the last set of blades being delivered through an exhaust hood indicated at 25 and thence downwardly to a throat or inlet opening 26 of a condenser 27 embodying this invention. The condenser 27 comprises a shell 28 divided into two similar condensing chambers 29 and 30 by a partition structure 31. The two halves of the condenser are symmetrical on the two sides of a vertical plane passing through the axis of the shaft 22 of the turbine, and the partition structure 31 is also symmetrical with respect to this plane. Each of the condensing chambers 29 and 30 has arranged therein a plurality of clusters of cooling water tubes 32, an equal number of the clusters 32 being arranged in each of the chambers in corresponding positions. The partition structure is arranged to provide the water distributing box or manifold for the cooling water to be circulated through the tubes. The partition structure is divided by a partition 33 to provide an inlet manifold communicating with a cooling water inlet valve 34 and an outlet manifold communicating with a water discharge valve 35. The configuration of the transverse partition 33 may be seen in Fig. 2 where it is shown extending between the ends of the clusters of tubes and dividing the partition structure into water boxes each of which communicates with the same number of clusters of tubes. Return water boxes or manifolds 37 are provided at the opposite ends of the condensing chambers 29 and 30 in order to provide communication between the tubes in all of the clusters in each end. It will thus be seen that water flowing from the inlet 34 to the set of clusters of tubes connected therewith will flow to the water box 37 and return to the clusters of tubes connected with the outlet 35. Thus there are provided two water paths in parallel and which are symmetrically arranged with respect to the central plane of the equipment.

Steam flows from the exhaust hood 25 through the inlet throat 26 and thence to both chambers 29 and 30 where it is cooled and condensed by heat exchange with the water flowing through the tubes in the clusters 32. The condensate flows or falls from the tubes toward the bottom of the condenser where it is collected in wells or sumps 38 on either side of the partition structure 31 and connected by a cross passage 39. Baffle plates 40 extend longitudinally of each section of the condenser and separate the well from the main portion of the condenser. The longitudinal edges of the plate 40 are provided with downturned flanges 41 which extend below the top edge 42 of longitudinal liquid collecting troughs 43. There is thus provided a gas trap when the troughs 43 are filled with condensate. In order that any noncondensible gases collecting in the wells 38 may be returned to the condenser and removed, in a manner to be described, the baffle 40 is provided with a plurality of centrally located openings 44 through which the noncondensible gas may be returned to the condenser proper. The condensate collected in the wells 38 is removed therefrom through outlet connections 45 at the opposite ends of the condenser chambers remote from the cross connection 39.

In order to remove noncondensible gases from the condenser chambers and to minimize the liklihood of the removal of steam or vapor therewith deaerator tubes 46 are arranged in several of the clusters of tubes and particularly in those remote from the steam inlet 26. Each of the deaerator tubes is provided with a plurality of openings 47 along its length and is located in a central position along the axis of the tube clusters; it is thus in a position where the noncondensible gas reaches it with a minimum likelihood of the removal of steam in any quantity. The number and size of the openings in each tube depends upon the relative volume of noncondensible gas to be removed by that tube. The deaerator tubes 46 are connected with an exhauster or outlet 49 which enters the water boxes 37 and is connected to one or more tubes 46 located in the corresponding condenser chamber 29 or 30.

The entire condenser structure is supported from the turbine shell through the throat casing 26 and no external suppports are supplied. It will thus be apparent that should there be an unbalanced weight or an unbalanced force on the shell of the condenser there will be unbalanced strains in the turbine casing which are objectionable. By constructing the two halves of the condenser so that they are symmetrical about the central plane through the axis of the turbine unbalance due to the structural arrangement of the condenser may be minimized and eliminated. Certain other factors may tend to bring about an unabance during the operation of the system. For example, the operation of the two halves of the condenser at unequal loads will result in a greater amount of condensate being collected in one of the wells 38 than in the other and during heavy load operation, even though the wells are connected together through the connection 39, there would be a tendency to have temporary unbalanced conditions. Another possible cause of unbalance is the force of circulation of the cooling water, and external forces can be produced by the connection of the cooling water inlet and outlet in a manner tending to produce a greater force on one portion of the casing than another. In order to secure balance during the operation of the condenser, arrangements have been provided for maintaining equal loads on the two halves of the condenser and for supplying and discharging the cooling water in a manner which does not subject the condenser casing to external forces.

It will readily be understood that the steam discharged from the turbine through the hood 25 contains a large amount of kinetic energy and is swirling and turbulent and that the distribution of the weight of steam over the cross sectional area of the throat 26 is not uniform. In order that an equal amount of steam shall be delivered to both the condenser chambers 29 and 30 so that equal loads are handled by both halves of the condenser there is provided an adjustable baffle member 50 which is pivoted on an axis 51 parallel to the axis 22 of the turbine and extending along the center line of the partition structure 31. This baffle or valve 50 divides the area of the throat 26 into two sections, one communicating with the chamber 29 and one with the chamber 30 and by positioning the baffle, the amounts of steam delivered to the two sections of the condenser are determined. This baffle may be adjusted manually or it may be adjusted automatically to maintain predetermined conditions in the two condensers. The automatic control may comprise, for example, a differential thermostat responsive to the temperatures of the condensate at the discharge ends of the two wells 38, and a motor driven mechanism actuated in accordance with the differential temperature to position the baffle 50 so that it is maintained in a position such that the temperatures are maintained equal in the two wells and the two condenser halves carry equal loads. Under this condition of operation, the weight of condensate in the two halves of the condenser will be equal and the forces on the turbine shell will remain undistorted, even when the loading changes over a wide range.

The cooling water flow system is arranged so that the inlet and discharge water flows on the central axis of the condenser. Furthermore, the flow of water through the two halves of the condenser tubing is symmetrical and no external forces are therefore set up by the water cooling system. It is recognized that a certain amount of unbalance may result from the clogging of the tubes on one side of the partition structure more than those on the other and to minimize this clogging an arrangement is provided which makes it possible easily to reverse the flow of cooling water through the tubes and thereby dislodge any sediment collected in the tubes without having to disconnect the system and without producing unbalanced forces in the system. The manner in which this reversing operation is accomplished will be described below. When the system is operating under light load the shock and impact of water mass may be minimized by the gradual shifting of the reversing valves.

In surface condensers, especially those with horizontal tubes, the condensate tends to collect on the lower sides of the tubes and thereby shield the tubes or cause water logging of the tube surface. Water logging reduces the effective surface area of the cooling tubes and decreases the efficiency of the condenser. In order to minimize water logging, and particularly in order to prevent condensate from one cluster of tubes from dripping onto the tubes and clusters below, each of the clusters of tubes may be provided with a collecting baffle 52 extending horizontally along the cluster of tubes. These baffles are in the form of shallow troughs and the water collected in the trough flows out through connections 53 by which it is led to the side of the condenser housing or directly downward to the well in a manner clearly indicated in Fig. 2. It will readily be apparent that with the staggered arrangement of the clusters of tubes as clearly shown in Fig. 2, the baffles or troughs 52 do not interfere with the flow of steam to the lower clusters, the clusters being spaced a substantial distance from one another and providing ample passage for the steam flowing downwardly from the throat 26. Each of the tube clusters 32 as shown on the drawing comprises a multitude of individual tubes 55 arranged parallel to one another in spaced relationship and having their ends passing through and secured in identically shaped end plates 56, these plates in the Figs. 1 and 2, being of diamond shape. Obviously, these plates may be of other shapes which can be fitted together to form the integral condenser head plates. It will thus be seen that the end plates or headers of the condenser each comprises a plurality of these diamond shaped plates welded together along their adjacent edges to provide a complete end plate structure. This arrangement of the tube clusters with their individual end or head plates facilitates servicing of the condensers since single tube clusters may be removed by cutting their end plates from the surrounding plate and service may be maintained by inserting a new, complete tube cluster while the removed cluster is being repaired. Access to the end plates for the purpose of cutting them out or replacing them may be had through manholes provided in the water boxes in a manner well known in the art. Tube clusters when cut free are removed longitudinally through the outer ends of the condenser casing, suitable removable closure members being provided for this purpose on the outer wall of the water boxes 37.

The details of construction of the tube clusters will be more readily apparent from Figs. 4, 5 and 6. In Figs. 4 and 5, a single plate 56 is illustrated with perforations 57 in which the tubes 55 are located. Each of the perforations 57 is preferably of the form indicated in Fig. 6, slightly belled so that the end of the tube 55 may be flared out, as shown in Fig. 6. This flared shape of the tube ends minimizes erosion or damage to the tubes which might otherwise be caused by the flow of water and particularly by the high turbulence and the possibility of so-called "hydraulic jumps" due to the sudden changes in the direction of the cooling water as it flows from the water box to the several tubes. The flared perforations 57 may be provided with annular indentations 57a so that the belled end of the tube may be rolled in to form an interfitting annular bulge to increase the effectiveness of the joint. The attaching of the tubes 55 to the plate 56 to provide the flared joint is preferably done at the factory or in a shop adequately prepared for this work. By providing the separate clusters or units 32, it will be apparent that it is a relatively easy matter to remove a unit having defective tubes therein and to ship the unit to the factory or shop. This arrangement avoids the present necessity of installing individual tubes on the site and simplifies the servicing of the condenser. Each of the plates 56 is provided with horizontally extending bosses 58 and a central boss 59. Bosses 58 are provided so that a supporting member or tube may be extended between the two end plates of a cluster to reinforce the tubes and provide a more rigid structure during shipment. A central supporting tube may be provided on the boss 59 and, of course, will remain in place when the cluster is in operation. However, this tube will normally constitute the deaerating tube 46 which is located in this position, one of the end plates 56 having an opening extending through the boss 59 so that the deaerating tube 46 may pass therethrough as shown in Fig. 1. The lower bosses 58 may also be employed as the supports for the longitudinal condensate collecting baffles 52. The end plates 56 of the clusters are provided with beveled edges as indicated at 60 to facilitate the welding of two adjacent plates as indicated at 61. The structural support afforded by the supporting tubes or the bosses 58 and 59 makes it possible to employ much lighter end plates and thus reduces the weight of the overall structure.

Figure 7:
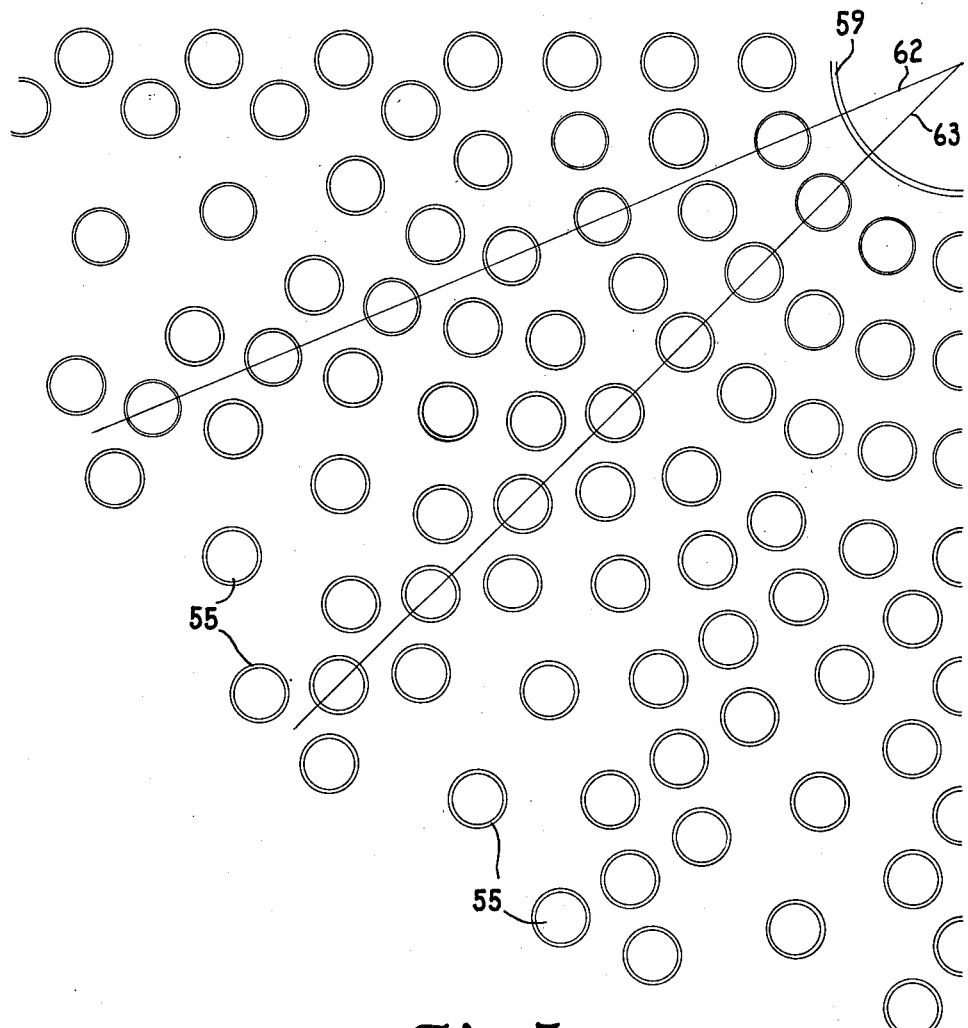
Fig. 7 is an enlarged section view of a portion of one of the tube clusters showing the pattern of the tubes.

During the operation of the condenser, the steam admitted to the condenser through the throat 26 flows downwardly striking the outer and primary surfaces of all the clusters of tubes within its path. It is the tendency of the steam to flow inwardly toward the center of each cluster from substantially the entire periphery, the condensing action taking place progressively as the steam approaches the center. This action of the steam in approaching the center is accentuated in the case of the lower clusters of tubes which include larger openings in the exhaust tubes 46 for removing noncondensible gases. In the case of these lower tubes, substantially all of the steam flowing over the steam surfaces of the cluster will have been condensed so that only the noncondensible gases remain to be removed through the openings 47 of the deaerating tubes 46. In order to increase the effectiveness of each of the clusters of tubes and to facilitate the condensing of the steam, the tubes of each cluster are arranged so that their spacing decreases toward the center of the cluster. A suitable pattern for the perforations in the end plates which determine the location of the tubes of each cluster is shown in Fig. 7, a quarter of the total perforations being shown in this figure. The spacing about the full area of the cluster is a repetition of that indicated between the two lines 62 and 63 in this figure. Here it can be seen that the spacing of the tubes from one another decreases steadily toward the center of the pattern. This arrangement greatly facilitates the flow of steam and the condensing action, the larger volume of steam flowing over the wider spaced tubes and, as the volume is decreased by condensation, the tubes are closer together so that they become more effective in condensing the remaining steam. The arrangement of the tubes in clusters provides wide lanes for the mass flow of steam between the clusters; furthermore, because of the wide lanes, the external surfaces may be reached easily for cleaning purposes, through manholes provided in the usual manner.

Figure 2:
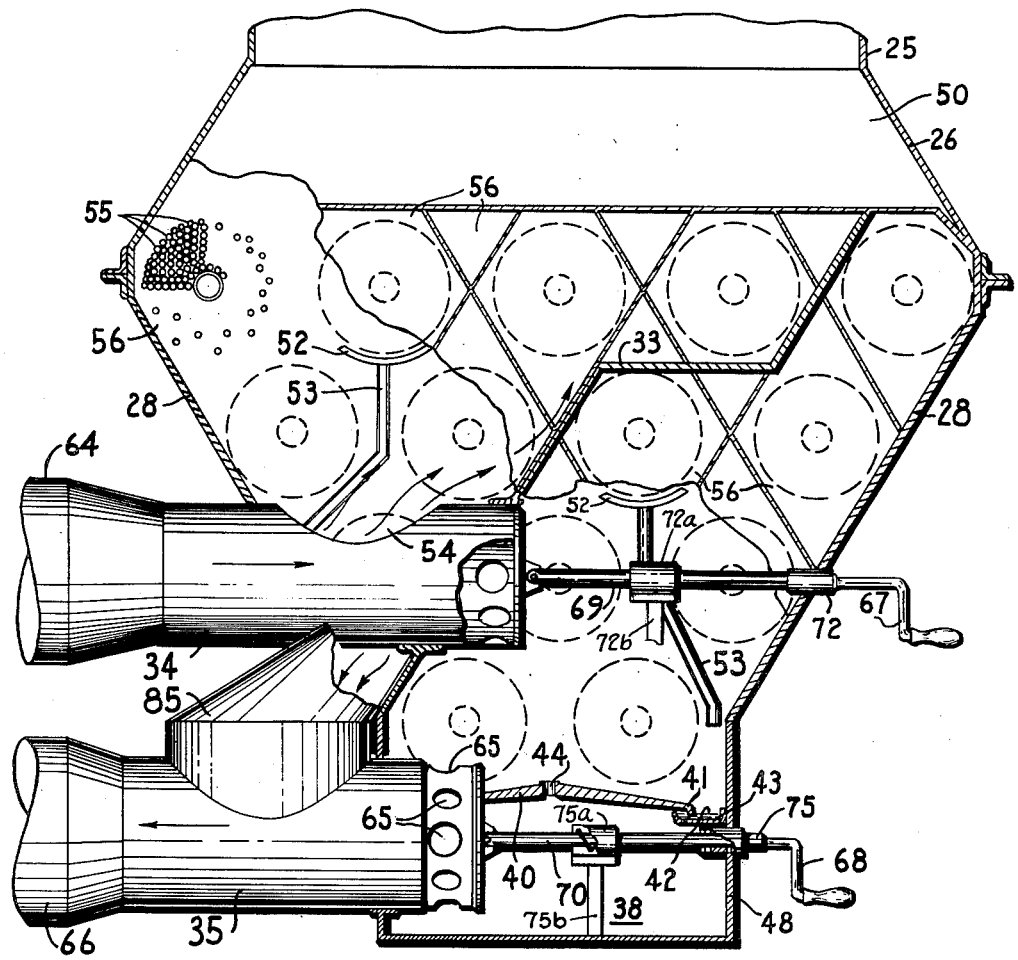
Fig. 2 is an enlarged sectional view along the line 2—2 of Fig. 1 with a portion broken away to show the water cooling tube construction.
Figure 3:
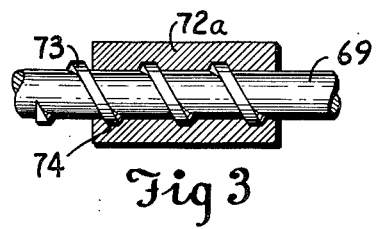
Fig. 3 is an enlarged detail of a valve actuating mechanism of the cooling water system for the condenser.

Turning now to the cooling water circulation system of the condenser, the construction and operation of the valves 34 and 35 will be understood from a consideration of Figs. 2, 3, 8, 9 and 10. The two valve structures 34 and 35 are the same and for purposes of illustration the valve 34 has been shown in Figs. 8, 9 and 10. Referring now to Fig. 2, water is supplied to the valve 34 from a conduit 64 and flows from the casing of the valve toward the seven clusters of tubes above the partition 33 as indicated by the solid arrows. The water then flows out through the clusters 32 communicating with valve 34 through the water box 37 at the far end of the condenser and back through the clusters of tubes below the partition 33 as viewed in Fig. 2. Then, as indicated by the arrows, the water flows out through openings or ports 65 in the valve 35 and thence to a water discharge conduit 66. When it is desired to reverse the flow of cooling water through the tubes for purposes of flushing the tubes and removing deposited sediment therein, cranks 67 and 68 attached to the valves 34 and 35, respectively, are rotated. The cranks 67 and 68 are connected to their respective shafts or rods 69 and 70. As illustrated in Figs. 2 and 3, the rod 69 enters the casing wall 28 through a packing bushing 72 and is mounted in a bearing 72a carried by a support 72b. The shaft is provided with a helix or thread 73 engaging a helical groove 74 in the bearing. The thread 73 is provided with a long lead so that a substantial movement of the rod along its axis is effected upon a 180° turn of the crank 67. Thus, the internal member of the valve 34 is rotated and moved axially upon movement of the crank 67. The rod 70 passes through the vertical wall 48 of the casing 28 in a packing bushing 75 and through a bearing 75a of the same construction as the bushing 72 and bearing 72a, respectively, and upon rotation of the crank 68, the same axial and rotative movement of the valve is accomplished. The details of construction and manner of operation of the valves will be more readily apparent from Figs. 8, 9 and 10. In Fig. 8 valve 34 is shown in the same position in which it appears in Fig. 2, and in Fig. 10 the valve is in its reversed position with the inlet passage above the wall 33 closed, and that in the forward end of the valve open.

As shown in Figs. 8, 9 and 10, the valve 34 includes an outer cylindrical casing 76 and an inner cylindrical casing 77 fitted closely within the casing 76. The right-hand end of the casing is open and the casing 77 may be rotated and moved axially within the casing 76. The right end of the casing 77 is closed by a plate fitted in the end thereof and indicated at 78 and which is attached to the rod 69 by a pivot 79 engaging a lug 80 formed on the outside of the closure 78. The pivot 79 may be removed for purposes of servicing the equipment. The casing 76 is provided with a substantially circular opening 82 in the side thereof and communicating with the space above the partition 33, as shown in Fig. 2, and the casing 77 is provided with a corresponding circular opening 84. At its right-hand end, the casing 77 is provided with a plurality of circular openings 65 spaced about the periphery of the casing. Thus, it will be seen that in Fig. 8 the two circular openings 82 and 84 are in registry so that water admitted to the valve 34 from the connection 64 flows outwardly and upwardly into the space above the partition 33. The several openings 65 in the casing 77 are closed by the outer casing 76. When it is desired to reverse the flow of the cooling water and admit the cooling water to the space in the water box below the partition 33, the crank 67 is turned and causes the inner cylinder 77 to be rotated substantially 180° thereby moving the openings 82 and 84 out of registry so that both are closed by the adjacent portions of the outer or inner casing and at the same time the inner casing is moved out from the outer casing 76 so that the openings 65 are exposed, as shown in Fig. 10. When the valve is in the position shown in Fig. 10, the water is admitted to the casing below the partition 33, flows out through the lower clusters of tubes back from the water box 37 through the tubes above the partition 33 and thence into a connection 85 between the outer wall of the condenser casing 28 and the circular opening in the top of the valve 35 which corresponds to the opening 82 in the top of the valve 34.

From a consideration of the construction of the valve 34, it is readily apparent how the valve 35 operates since it is of the same construction except, of course, for the external connection 85 which provides communication between the upper port of the valve 35 and the portion of the water box above the partition 33. It is readily apparent that by simultaneous operation of the cranks 67 and 68, the flow of water through the cooling passages of the condenser can be reversed without interruption of the system so that the tubes can be cleared out periodically without shutting down the equipment. Furthermore, it will be noted that the operating members 69 and 70 and the moving parts of the water valves are all in vertical alignment in the central vertical plane of the equipment and within the partition structure 31. This provides a balanced structure with minimum likelihood of applying unbalanced forces to the turbine hood during the operation of the cooling system and particularly during the reversal of the system.

Figure 11:
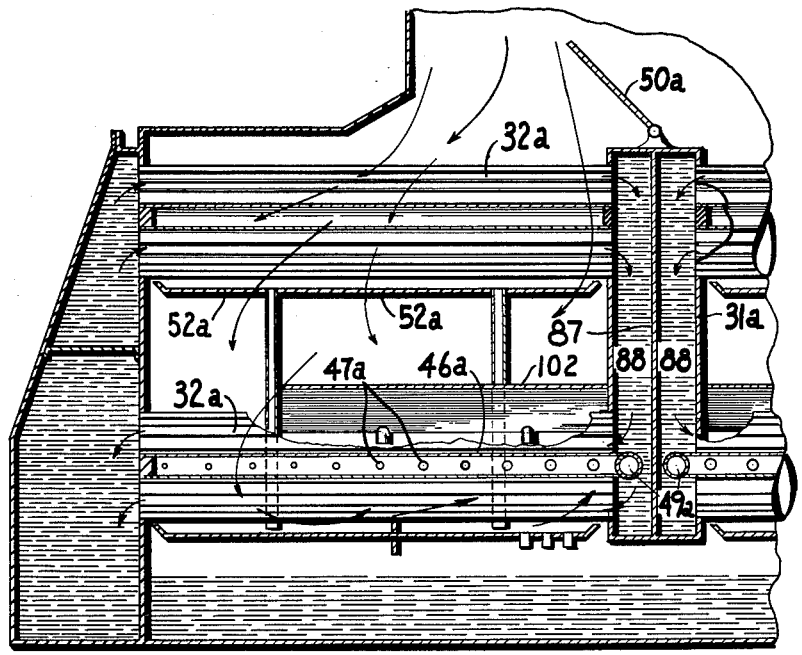
Fig. 11 is a longitudinal sectional view of a portion of condenser illustrating another embodiment of the invention.
Figure 12A:
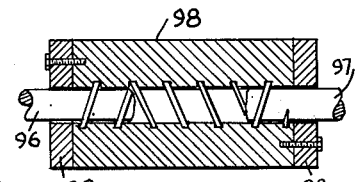
Fig. 12a is an enlarged detail sectional view of a portion of the valve actuating mechanism of Fig. 12.
Figure 12:
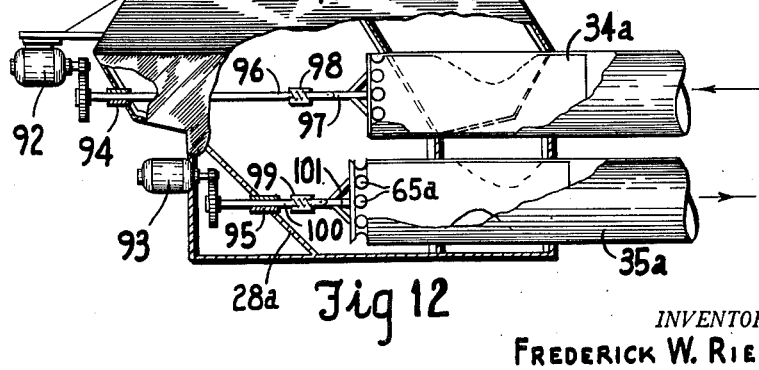
Fig. 12 is an end elevation view of the condenser of Fig. 11 partially in section to show the inlet and outlet valves.
Figure 13:
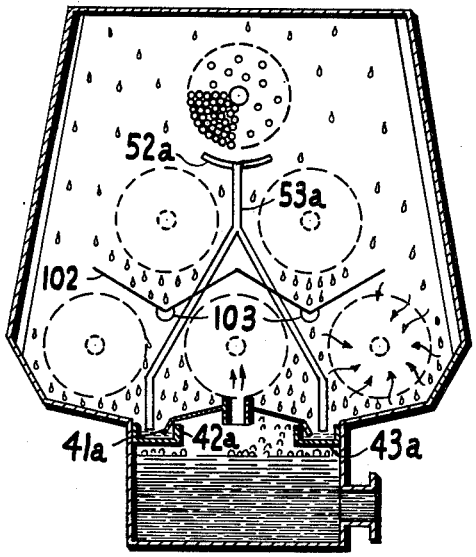
Fig. 13 is a sectional view of Fig. 11.

In Figs. 11, 12, and 13, there is illustrated a modified form of the balanced condenser construction which is generally similar to that shown in Fig. 1 and corresponding parts have been designated by the same numerals with the addition of the letter a. The most significant difference in construction between the present condenser and that of Fig. 1 is that the cooling water flow paths have been changed, the inlet for the cooling water being at the outer ends of the circulating tubes rather than within the partition structure at the center, and the partition structure being divided by a vertical partition to provide the separate return manifolds or headers for the two balanced sets of condenser tubes. Thus, as indicated, the partition structure 31a is provided with a vertical partition 87 extending from the top to the bottom thereof and dividing the partition structure into two separate water manifolds 88. The inlet and outlet water box structure at one end of the condenser is illustrated in Fig. 12, where it can be seen that the water flows into the valve structure 34a and thence through manifold portion of the inlet box structure above a partition structure 33a from which it flows through the groups of cooling water tubes in a manner similar to the circulation condenser Fig. 1, and returns to the portion of the water box below the partition 33a and thence enters the end ports 65a of the valve 35a. It will be understood that a duplicate set of inlets and valve controls is provided at the opposite end of the condenser. Manholes 89 and 90 may be provided to gain access to the portion of the water box for inspection and minor servicing operations.

As shown in Fig. 12, the operating members for the valve 34a and 35a are motor operated, they being provided with motors 92 and 93, respectively, which may be controlled from a central location so that both valves are operated simultaneously. In the arrangement of this modification, the motors 92 and 93 are stationary and their shafts pass through the casing 28a through stuffing boxes 94 and 95, respectively. As shown in Figs. 12 and 12a, the shaft for actuating the valve 34a is made in two sections 96 and 97, respectively, connected by a threaded portion engaging a floating coupling 98 haxing a long lead thread similar to the thread provided on the bearing 72a of the condenser of Fig. 1 and having stop plates 98a to retain the coupling in engagement with both shaft sections. Thus, when the motor 92 is rotated, the relative movement of the two shaft parts in coupling 98 will cause axial movement of the shaft 97 to operate the valve. The motor 93 is connected to actuate the valve 35a through a similar coupling structure 99, the actuating shaft of the valve 35a being constructed in two sections 100 and 101, respectively. The details of the shaft couplings 96, 98 and 97 and also 100, 99 and 101 form no part of the present invention and other valve actuation means may be used without departing from the spirit of this invention.

In this modification of the invention deaerator tubes 46a are connected to headers within the partition structure 31a as indicated at 49a. It will be recognized that by maintaining equal rates of flow of water from the two ends of the condenser and by operation of the valve 50a to distribute the steam evenly over the two sections of the condenser, there will result the same type of balanced operation which is afforded by the construction of the condenser of Fig. 1.

In the condenser of Fig. 11, the path of the steam over the two sections of the condenser is directed so that in the lower section there is a counterflow of the steam and of the cooling water longitudinally along the tubes of the lowermost clusters of tubes. This baffling arrangement facilitates the uniform distribution of steam over the full area of the surface of the condensing tubes and assures removal of the noncondensible gases at a point more remote from the inlet of the condenser along the line of movement of the steam.. The steam flow baffle is indicated at 102 in Figs. 11 and 13 and as shown in Fig. 13, this baffle also serves as a condensate collecting baffle and is provided with drains at 103 in the two lower or trough portions thereof, the cross section of the baffle being in the form of two V's or troughs. This baffle thus serves to take the place of the condensate collecting troughs 52a which would otherwise be provided for the two intermediate tube clusters as shown in Fig. 13.

As shown in Fig. 13, the tube clusters of this modification have been arranged in an upright triangle and the opening about the tube cluster at the apex is the full opening of the steam hood of the condenser. Thus, the steam is free to flow downwardly to the lower clusters of tubes through a large vapor space. Consequently, the effective primary cooling area of the condenser extends over a full two sides of the triangle formed by the several tube clusters. In this manner, a large primary cooling surface is provided.

The remaining features of this modification of the invention and also the manner of operation can readily be apparent in view of the description of the construction and method of operation of the modification of Fig. 1.

In Figs. 14 through 18, inclusive, there is shown a modified form of this invention which illustrates the manner in which the balanced construction and mode of operation of the invention may be utilized to secure a more effective arrangement of the components of the condenser which facilitates the servicing and also the arrangement of the condensing equipment in the power house. In this modification, the tubes of the condenser are arranged at angles inclined to the horizontal in a manner which reduces the space requirements of the equipment and furthermore provides additional available space for the location and operation of heat transfer equipment or heat exchangers constituting parts of the auxiliary equipment of the power plant. The overall arrangement of this equipment and its mode of operation are similar to that of the other modifications illustrated and corresponding parts have been designated by the same numerals as those of Fig. 1 with the addition of the letter b.

Figure 14:
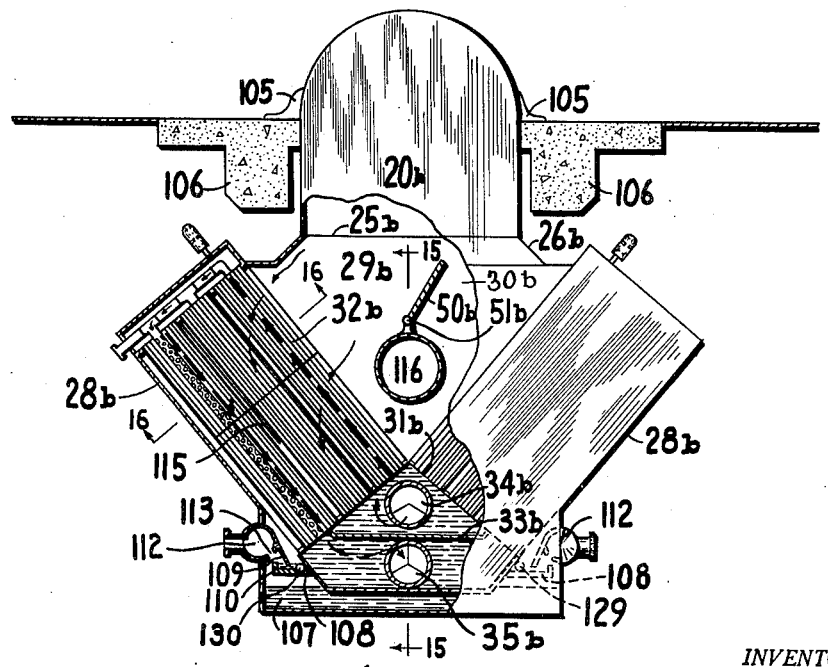
Fig. 14 is a sectional view similar to that of Fig. 1 illustrating a modified form in the invention.

Referring now to Fig. 14, the turbine indicated at 20b is mounted on supporting hangers 105 which rest on heavy structural beams 106 of the power plant building. The condenser casing 28b is formed to have a generally V-shaped cross section and the tube clusters 32b extend upwardly and outwardly from a centrally located partition structure 31b. The central water box or manifolds in the partition structure are formed by a partition wall 33b and the flow of cooling water is regulated by operation of control valves 34b and 35b in the same manner as that of the valves 34 and 35 of the modification of Fig. 1. In this modification, a well 107 for collecting the condensate is formed by a portion of the casing 28b which extends below and is spaced from the partition structure 31b. It will readily be apparent that the condensed steam will flow along the lower surfaces of the tubes and downwardly toward the partition structure 31b. The arrangement of the tubes at an angle in this manner serves to minimize the possible water logging of the tubes, and the steam, as it condenses, flows rapidly away from the heat transfer surface so that the condensate does not remain on the surface and blanket it. The condensate which reaches the walls of the casing 28b and of the partition structure 31b below the condenser tubes then flows into collecting troughs 108 on the two sides of the well 107. A vapor barrier is provided at each trough 108 by a baffle 109 which extends downwardly below the edge of a side wall 110 of the troughs 108. Thus, there is provided a barrier to the flow of vapor between the well 107 and the sections of the condenser proper. When condensate collects in the troughs 108, it fills them and overflows the edges 110 of the troughs and thus enters the well 107. As the condensate flows over the edges 110, air and other noncondensible gases leave the condensate and collect above the water in the well. In order to remove these noncondensible gases exhaust connections 112 are provided at both sides of the well 107. These connections have inlets 113 immediately above the edge of the trough at 110 and as a result, the air or other gases which are freed from the water flow immediately to the exhaust connections. This arrangement provides effective deaeration of the condensate well and prevents the return of the gases in the condensate to the condenser proper. The details of construction of the deaeration equipment for the well 107 are more clearly shown in the enlarged Fig. 17. Thus, it is evident that the blanketing of the condenser cooling tubes by the noncondensible gases removed from the condensate is avoided.

Figure 15:
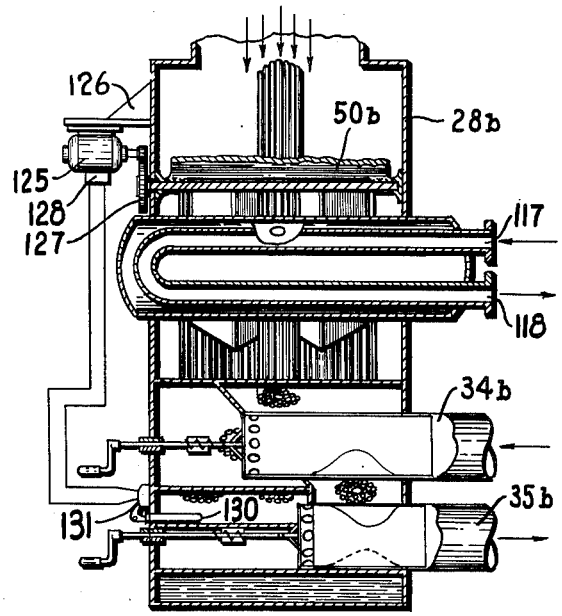
Fig. 15 is a sectional view on the line 15—15 of Fig. 14.
Figure 16:
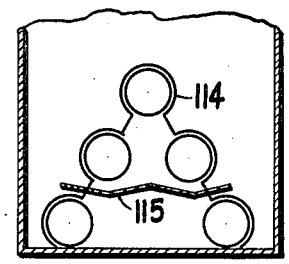
Fig. 16 is a diagrammatic sectional view of the condenser of Fig. 14 for illustrating certain characteristics of operation.
Figure 17:
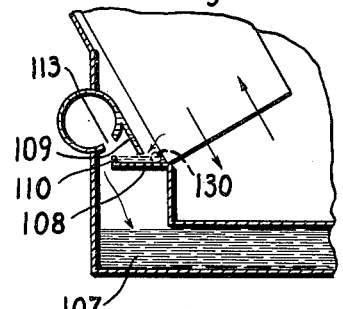
Fig. 17 is an enlarged sectional view of a detail of the condenser of Fig. 14.

As shown in Figs. 15 and 16, the clusters 32b are arranged in the general triangular form similar to that of the modification in Figs. 11, 12 and 13. This arrangement provides an extended primary cooling surface as illustrated diagrammatically in Fig. 16, the effective primary cooling surface being indicated by a heavy line 114 in this figure. In this arrangement there is also employed a baffle 115 which extends longitudinally of the clusters of tubes and provides a barrier between the three upper clusters and the three lower clusters as illustrated. This baffle 115 extends downwardly from the upper end of the condenser chamber and terminates short of the bottom so that steam flowing over the upper tubes tends to enter the lower area at the bottom and to flow upwardly along the last clusters of the tubes in general counterflow relationship to the cooling water flowing through the tubes therein. The baffle 115 does not extend entirely across the condenser chamber as this is not necessary to the operation of the condenser in the required manner.

Another advantage of this V-shaped construction is that additional space within the condenser between the two sets of condenser tubes is provided and this may be employed for the operation of heat exchange equipment such as feed-water heater indicated at 116. This feedwater heater as indicated in Fig. 15 comprises a cylindrical casing within the path of the hot steam above the condenser tubes and constitutes a supplementary partition structure in advance of and in alignment with the partition structure 31b, the flow controlling vane or valve 50b being mounted above the feed-water heater. The water to be heated is admitted to the feed-water heater through a connection 117 and the heated water is discharged through a connection 118.

Figure 18:
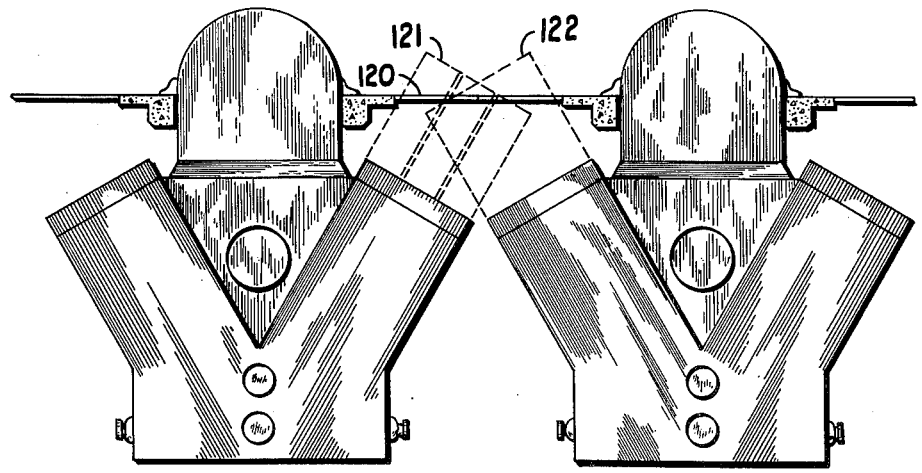
Fig. 18 is an end elevation view of two turbines provided with condensers embodying the invention of Fig. 14.

Another advantage of the V-shaped arrangement of the condenser sections is that the entire equipment requires less floor space. Furthermore, as illustrated in Fig. 18, two such V-shaped condenser equipments may be arranged side by side and the floor structure arranged so that there is a free space above the ends of the condenser sections so that when a removable floor section such as that indicated at 120 is removed, the condenser tube clusters may be separated from the condenser and removed along lines generally indicated at 121 for the right-hand equipment and 122 for the left-hand equipment. It is thus apparent that the two units may be arranged close together and still afford easy access and servicing of the condenser tubes together with the removal of those tubes for replacement or repair.

This entire assembly wherein the tubes are arranged in V-shaped configuration makes it possible to construct the condenser so that it is materially lighter than condensers in use today and the balanced construction and operation make it feasible to support the entire condenser from the turbine exhaust hood.

In Figs. 14 and 15 there is also illustrated a control arrangement for automatically positioning the vane 50b to assure equal distribution of steam to the two symmetrical condensing chambers 29b and 30b. An electric motor 125 is mounted on a bracket 126 on the side of the casing 28b and is connected through a reduction gearing 127 to drive the shaft 51b of the vane 50b. The motor is actuated by a controller 128 also mounted in the bracket and energized in accordance with the difference between the temperatures of the condensate in two sections of the condenser. The temperature control including feeder bulbs 129 and 130 in the respective two sections of the condenser and a differential control 131 actuated in response to the two temperatures and in turn energizing the controller 128 when there is a difference between the temperatures. For example, when the temperature at the bulb 129 is higher than that at the bulb 130, the motor is operated to move the vane 50b farther to the right as viewed in Fig. 14 to reduce the portion of steam directed to the condenser chamber 30b. The reverse operation is effected when the temperature at the bulb 129 is lower than that at the bulb 130.

All the illustrated modifications of this invention make it possible to reduce the volume of cooling water required in the equipment and to construct a lighter and a smaller condenser for a given capacity. Maximum effective use of the condenser cooling surface is afforded so that lower condensate temperatures are possible; balanced operation and minimum strain on the turbine housing is obtained.

While various constructions and arrangements of this invention have been illustrated, by way of example, various applications and modifications will occur to those skilled in the art. Therefore, it is not desired that this invention be limited to the specific construction illustrated and described and it is intended by the appended claims to cover all modifications of the invention which fall within the spirit and scope thereof.

I claim:

1. A surface condenser for condensing exhaust steam from steam turbines and the like comprising a casing symmetrically arranged on the two sides of a central vertical plane, said casing having a centrally located inlet opening near the top thereof for communication with the exhaust hood of a steam turbine or the like, a partition structure for dividing said casing into two oppositely arranged condensing chambers, means including a plurality of tubes in each of said chambers for conducting cooling fluid therethrough in heat exchange relationship with the steam in said chambers, an adjustable baffle member mounted in said casing above said partition means for determining the relative amounts of steam flowing from said inlet to each of said chambers, and means dependent upon the difference between the temperatures of the condensate in said chambers for positioning said baffle member to equalize the load carried by said two condensing chambers.

2. A surface condenser for condensing exhaust steam from steam turbines and the like comprising a casing symmetrically arranged on the two sides of a central vertical plane, said casing having a centrally located inlet opening near the top thereof for communication with the exhaust hood of a steam turbine or the like, a partition structure for dividing said casing into two oppositely arranged condensing chambers of substantially equal capacity, means including a plurality of tubes in each of said chambers for conducting cooling fluid therethrough in heat exchange relationship with the steam in said chambers, said partition structure having therein manifold passages for connecting the ends of the tubes in each of said chambers to effect circulation of cooling fluid in predetermined circuits of substantially equal thermal capacity through said chambers, and an adjustable baffle member mounted in said casing above said partition means for determining the relative amounts of steam flowing from said inlet to each of said chambers.

3. A vapor condensing unit comprising a pair of spaced parallel end plates of quadrilateral form having their edges in alinement, each of said end plates having a generally circular pattern of perforations therein occupying substantially the entire central area thereof, said plates and said patterns being symmetrical about at least one common axis, a plurality of tubes each extending between said plates and passing through the respective ones of the perforations thereof to form a cluster of spaced parallel tubes for the passage of cooling fluid, and a perforated tube passing through at least one of said plates and extending centrally of the cluster of tubes to afford the removal of gas from the space between said tubes.

4. A surface condenser for condensing exhaust steam from steam turbines and the like comprising a plurality of clusters of spaced parallel tubes, each cluster being of generally circular cross-section and comprising a plurality of tubes mounted between pairs of similar quadrilateral end plates, each of said end plates being of the same shape and being symmetrical about at least one central axis in the plane of the plate, the edges of said plates at each end of said condenser abutting the edges of adjacent plates and being welded together to form a large end wall of the condenser, means for conducting steam over said clusters of tubes, and means cooperating with said end walls to form a manifold box for directing a circulation of cooling fluid through said clusters of tubes in predetermined order.

5. A surface condenser for condensing exhaust steam from steam turbines and the like comprising a shell having an inlet for receiving exhaust steam, a plurality of tubes within and extending across said shell, means for conducting cooling water through said tubes, said means comprising a manifold having a transverse partition providing two chambers each in communication with a substantially equal number of said tubes; water return manifolds at the other ends of said tubes and providing communication therebetween, inlet and outlet valve casings extending through said shell and each having one opening in communication with one of said chambers and another opening in communication with the other of said chambers, and a valve member in each of said casings for simultaneously closing one of said openings therein and for opening the other and vice versa whereby the direction of flow of cooling water through said tubes may be reversed by simultaneous reversal of said valve members.

6. A surface condenser as set forth in claim 5, wherein each of said valve members is movable axially to open and close one of the openings in its casing and is rotatable to open and close the other of the openings in its casing, and including means for rotating and axially moving each of said valve members.

7. A surface condenser for condensing exhaust steam from steam turbines and the like comprising a casing symmetrically arranged on the two sides of a central vertical plane, said casing having a centrally located inlet opening near the top thereof for communication with the exhaust hood of a steam turbine or the like, a partition structure for dividing said casing into two oppositely arranged condensing chambers of substantially equal capacity, means including a plurality of tubes in each of said chambers for conducting cooling fluid of substantially equal thermal capacity therethrough in heat exchange relationship with the steam in said chambers, an adjustable baffle member mounted in said casing above said partition means for determining the relative amounts of steam flowing from said inlet to each of said chambers, the lower portion of said casing on each side providing a well for collecting condensate formed on its respective side of said partition, and said partition structure having a passage therethrough providing communication between said wells for equalizing the levels of the condensate on the two sides of said casing.

8. A surface condenser for condensing exhaust steam from steam turbines and the like comprising a casing symmetrically arranged on the two sides of a central vertical plane, said casing having a centrally located inlet opening near the top thereof for communication with the exhaust hood of a steam turbine or the like, a partition structure for dividing said casing into two oppositely arranged condensing chambers of substantially equal capacity, means including a plurality of tubes in each of said chambers for conducting cooling fluid therethrough in heat exchange relationship with the steam in said chambers and in substantially equal quantities and temperatures in both chambers, an adjustable baffle member mounted in said casing above said partition means for determining the relative amounts of steam flowing from said inlet to each of said chambers, and means communicating with said chambers at symmetrically located points on the two sides of said plane and remote from said inlet opening for removing noncondensible gases therefrom.

9. A surface condenser for condensing exhaust steam from steam turbines and the like comprising a casing symmetrically arranged on the two sides of a central vertical plane, said casing having a centrally located opening near the top thereof for communication with the exhaust hood of a steam turbine or the like, a partition structure for dividing said casing into two oppositely arranged condensing chambers, a plurality of tubes within each of said chambers and extending thereacross, means for conducting cooling water through said tubes, said means comprising a manifold formed within said partition structure and having a transverse wall providing two sections each in connection with a substantially equal number of said tubes on both sides of said plane, water return manifolds on the other ends of said tubes, inlet and outlet valve casings of cylindrical form extending into said partition structure and each having one opening in communication with one of said sections and another opening in communication with the other of said sections, and valve members in said cylindrical casing for simultaneously closing one of said openings and for opening the other and vice versa whereby the direction of the flow of cooling water through said tubes may be reversed by simultaneous reversal of said valve members, said cylindrical casings being arranged one above the other with their longitudinal axes lying in said plane.

10. A surface condenser for condensing exhaust steam from steam turbines and the like comprising a plurality of clusters of spaced parallel tubes, each cluster being of generally circular cross-section and comprising a plurality of tubes mounted between pairs of similar quadrilateral end plates, each of said end plates being of the same shape and being symmetrical about at least one (centroidal) axis in the plane of the plate, the edges of said plates at each end of said condenser abutting the edges of adjacent plates and being welded together to form one large end wall of the condenser, means providing an inlet for admitting exhaust steam to said condenser, said clusters of tubes being arranged to provide a cooling zone of substantially triangular cross-section with one apex of the triangle toward said inlet, and means including a shell for said condenser for conducting steam from said inlet over the clusters of tubes and being substantially spaced from the two sides of said triangle adjacent said apex whereby an extended primary cooling surface is provided.

11. A surface condenser for condensing exhaust steam from steam turbines and the like comprising a casing symmetrically arranged on the two sides of a central vertical plane, said casing having a centrally located inlet opening near the top thereof for communication with the exhaust hood of a steam turbine or the like, a partition structure for dividing said casing into two oppositely arranged condensing chambers of substantially equal capacity, means including a plurality of tubes in each of said chambers for conducting substantially equal quantities of cooling fluid through said chambers at substantially the same temperature and in heat exchange relationship with the steam in said chambers, means providing a condensate well in said casing, a horizontal baffle interposed between said well and said condenser chambers and extending the length of said well, a condensate receiving trough extending the length of said well along the edge of said baffle for collecting condensate, said trough being located above said well whereby condensate overflowing the edge of said trough falls into said well, and the edge of said baffle lying below the edge of said trough and providing a barrier extending the length of said trough for minimizing the flow of gas from said condensing chambers to said well, and means extending the length of said well adjacent said trough for removing noncondensible gas from said well.

12. A surface condenser for condensing exhaust steam from steam turbines and the like comprising a casing symmetrically arranged on the two sides of a central vertical plane, said casing having a centrally located inlet opening near the top thereof for communication with the exhaust hood of a steam turbine or the like, a partition structure for dividing said casing into two oppositely arranged condensing chambers of substantially equal capacity, means including a plurality of tubes in each of said chambers for conducting cooling fluid therethrough in heat exchange relationship with the steam in said chambers, the tubes in said chambers providing cooling surface symmetrical with respect to said plane, means in said partition structure providing inlet and outlet manifolds for said tubes, return manifolds connecting the ends of said tubes remote from said inlet and outlet, cooling water inlet and outlet connections having their axes on said vertical plane and lying one above the other for supplying water to and withdrawing water from said tubes whereby the cooling capacities of the tubes in said two chambers are substantially equal, and an adjustable baffle member mounted in said casing above said partition means for determining the relative amounts of steam flowing from said inlet to each of said chambers.

13. A surface condenser for condensing exhaust steam from steam turbines and the like comprising a shell having an inlet for receiving exhaust steam, a plurality of tubes within and extending across said shell, means for conducting cooling water through said tubes, said means comprising a manifold having a transverse partition providing two chambers each in communication with a substantially equal number of said tubes, water return manifolds at the other ends of said tubes and providing communication therebetween, inlet and outlet connections extending through said shell and communicating with respective ones of said chambers whereby cooling water may be circulated outwardly through one set of said tubes and back through the other set of said tubes, and a longitudinal baffle arranged in said shell between the outgoing set and incoming set of said tubes for directing steam outwardly along said second set of tubes whereby substantial counterflow of steam and cooling water is provided.

14. A surface condenser for condensing exhaust steam from steam turbines and the like comprising a casing symmetrically arranged on the two sides of a central vertical plane, said casing having a centrally located inlet opening near the top thereof for communication with the exhaust hood of a steam turbine or the like, a partition structure for dividing said casing into two oppositely arranged condensing chambers, means including a plurality of tubes in each of said chambers for conducting cooling fluid therethrough in heat exchange relationship with the steam in said chambers to provide substantially equal cooling capacity in said chambers, inlet and outlet manifolds for said tubes arranged within said partition structure, and water supply and discharge conduits communicating with the respective ones of said manifolds and lying one above the other in the lower portion of said structure and with their longitudinal axes in said central plane.

15. A surface condenser for condensing exhaust steam from steam turbines and the like comprising a casing symmetrically arranged on the two sides of a central vertical plane, said casing having a centrally located inlet opening near the top thereof for communication with the exhaust hood of a steam turbine or the like, a partition structure for dividing said casing into two oppositely arranged condensing chambers, means including a plurality of tubes in each of said chambers for conducting cooling fluid therethrough in heat exchange relationship with the steam in said chambers, said tubes and the portions of said casing forming said chambers being inclined upwardly at an acute angle to said plane whereby the transverse cross section of said condenser is generally V-shaped in form, return headers connecting the upper ends of said tubes in each chamber, said partition structure having therein manifold passages for connecting the lower ends of the tubes in each of said chambers to effect circulation of cooling fluid in predetermined circuits through said chambers, exhaust means in said chambers remote from said inlet of said casing for withdrawing noncondensible gases from said condensing chambers, said casing providing a well below said structure and in communication with said chambers for collecting condensate flowing from said chambers, and exhaust means for withdrawing noncondensible gases from said well.

16. A surface condenser for condensing exhaust steam from steam turbines and the like comprising a casing symmetrically arranged on the two sides of a central vertical plane, said casing having a centrally located inlet opening near the top thereof for communication with the exhaust hood of a steam turbine or the like, a partition structure for dividing said casing into two oppositely arranged condensing chambers of substantially equal capacity, an adjustable baffle mounted for swinging movement on a substantially horizontal axis in said vertical plane for determining the relative amounts of steam flowing from said inlet to each of said chambers.

17. A surface condenser for condensing exhaust steam from steam turbines and the like comprising a casing symmetrically arranged on the two sides of a central vertical plane, said casing having a centrally located inlet opening near the top thereof for communication with the exhaust hood of a steam turbine or the like, a partition structure for dividing said casing into two oppositely arranged condensing chambers, means including a plurality of tubes in each of said chambers for conducting cooling fluid therethrough in heat exchange relationship with the steam in said chambers, said tubes and the portions of said casing forming said chambers being inclined upwardly at an acute angle to said plane whereby the transverse cross section of said condenser is generally V-shaped in form, return headers connecting the upper ends of said tubes in each chamber, said partition structure having therein manifold passages for connecting the lower ends of the tubes in each of said chambers to effect circulation of cooling fluid in predetermined circuits through said chambers, and said casing providing a well below said structure and in communication with said chambers for collecting condensate flowing from said chambers.

18. A surface condenser as set forth in claim 17 wherein a fluid heat exchanger is mounted above said partition structure and below said inlet opening and constitutes a partition element in advance of said partition structure.

19. A surface condenser as set forth in claim 17 wherein said tubes are arranged in clusters and including at least one noncondensible gas removal pipe in each of said chambers extending parallel to said tubes within corresponding clusters and having spaced gas inlets along the length thereof whereby noncondensible gas is removed at a plurality of different gas density levels in each of said chambers.

20. In a steam condenser of the type adapted to be suspended directly from the exhaust hood of a steam turbine or the like, the method of minimizing the mechanical strains on the exhaust hood which comprises arranging symmetrical condenser chambers of substantially equal capacity on the two sides of the central longitudinal plane of the turbine, directing steam from the exhaust hood into both condenser chambers, and adjusting the flow of steam from said hood to said condenser chambers to maintain equal mass flow of steam to both the chambers.

21. In a steam condenser of the type adapted to be suspended directly from the exhaust hood of a steam turbine or the like, the method of minimizing the mechanical strains on the exhaust hood which comprises arranging symmetrical condenser chambers having cooling water tubes of substantially equal thermal capacity arranged therein on the two sides of the central longitudinal plane of the turbine, directing steam from the exhaust hood into both condenser chambers, adjusting the flow of steam from said hood to said condenser chambers to maintain equal mass flow of steam to both the chambers, and providing cooling water supply and discharge connections one above the other in the central plane and directing equal quantities of cooling water simultaneously to the tubes in both chambers.

22. A surface condenser for condensing exhaust steam from steam turbines and the like comprising a casing symmetrically arranged on the two sides of a central vertical plane, said casing having a centrally located inlet opening near the top thereof for communication with the exhaust hood of a steam turbine or the like, a partition structure for dividing said casing into two oppositely arranged condensing chambers, means including a plurality of tubes in each of said chambers for conducting cooling fluid therethrough in heat exchange relationship with the steam in said chambers, said tubes and the portions of said casing forming said chambers being inclined upwardly at an acute angle to said plane whereby the transverse cross-section of said condenser is generally V-shape in form, return headers connecting the upper ends of said tubes in each chamber, and unitary means including said partition structure for providing inlet and outlet cooling water circulating passages in communication with the lower ends of said tubes in both said chambers at the bottom ends thereof.

23. A surface condenser for condensing exhaust steam from steam turbines and the like comprising a casing symmetrically arranged on the two sides of a central vertical plane, said casing having a centrally located inlet opening near the top thereof for communication with the exhaust hood of a steam turbine or the like, a partition structure for dividing said casing into two oppositely arranged condensing chambers, means including a plurality of inclined tubes for conducting cooling fluid therethrough in heat exchange relationship with the steam in said chambers, said inclined tubes in said two chambers sloping upwardly and away from one another whereby said condenser is of V-shape cross section, means providing a rectangular condensate well extending the full length of the bottom portion of said casing below said chambers, troughs extending the length of said well adjacent the lowermost portion of each condenser chamber for collecting condensate formed therein, inclined baffles extending the length of said well in the upper portion thereof and spaced from and terminating below the level of the tops of said troughs for isolating vapor in said condensers from vapor in said well, and means adjacent the overflow edges of said troughs for removing noncondensible gases from said well.

References Cited in the file of this patent

UNITED STATES PATENTS

| | | |
|---|---|---|
| 1,105,320 | Christie | July 28, 1914 |
| 1,328,828 | Ehrhart | Jan. 27, 1920 |
| 1,502,256 | Lonsdale | July 22, 1924 |
| 1,502,257 | Lonsdale | July 22, 1924 |
| 1,550,332 | Bancel | Aug. 18, 1925 |
| 1,589,646 | Hicks | June 22, 1926 |
| 1,622,374 | Goodwillie | Mar. 29, 1927 |
| 1,626,849 | Lucke | May 3, 1927 |
| 1,651,900 | Pagel | Dec. 6, 1927 |
| 1,684,227 | Johnsen | Sept. 11, 1928 |
| 2,168,902 | Grace | Aug. 8, 1939 |